(12) United States Patent
Nakasuka et al.

(10) Patent No.: US 7,483,242 B2
(45) Date of Patent: Jan. 27, 2009

(54) ARM POSITIONING APPARATUS FOR MANUFACTURING A ROTARY TYPE ACTUATOR

(75) Inventors: Kazunao Nakasuka, Ozu (JP); Masato Masuda, Ozu (JP); Yasuyuki Hamaguchi, Ozu (JP); Takuo Kunita, Matsuyama (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 10/089,397

(22) PCT Filed: Jul. 25, 2001

(86) PCT No.: PCT/JP01/06419

§ 371 (c)(1),
(2), (4) Date: Mar. 29, 2002

(87) PCT Pub. No.: WO02/11141

PCT Pub. Date: Feb. 7, 2002

(65) Prior Publication Data

US 2002/0196587 A1    Dec. 26, 2002

(30) Foreign Application Priority Data

Jul. 31, 2000   (JP)   ............................. 2000-231753
Jun. 13, 2001   (JP)   ............................. 2001-177833

(51) Int. Cl.
*G11B 5/60*    (2006.01)

(52) U.S. Cl. .................................................. 360/235.7
(58) Field of Classification Search .............. 360/265.9, 360/235.7
See application file for complete search history.

(56) References Cited

U.S. PATENT DOCUMENTS 5,270,887 A * 12/1993 Edwards et al. .......... 360/97.03

FOREIGN PATENT DOCUMENTS

JP    9-306111 A    11/1997

* cited by examiner

*Primary Examiner*—David D Davis
(74) *Attorney, Agent, or Firm*—Panitch Schwarze Belisario & Nadel LLP

(57) ABSTRACT

The present invention is formed such that, in order to provide a rotary type actuator and a manufacturing method thereof wherein the precision of the attachment of the arms is increased, the dimensional change of the arms does not occur even during operation and grounding is achieved with reliability, grooves 1*a* which have a width greater than the thickness of arms 2 in a plate shape are formed in the external surface of a holder 1 in a cylindrical shape and one end of an arm 2 is inserted into one of these grooves 1*a* so as to be placed on the lower surface of the groove 1*a*, and, the holder 1, the arms 2, the coil 4 and a conductive member 5 in a band shape that makes an electrical connection between the holder 1 and the arms 2 are injection molded with a resin 6 in the above condition so as to be integrally secured to each other.

5 Claims, 8 Drawing Sheets

(a)

(b)

(a)

(b)

ARM POSITIONING APPARATUS FOR MANUFACTURING A ROTARY TYPE ACTUATOR

TECHNICAL FIELD

The present invention relates to a rotary type actuator, used for a magnetic disk apparatus, a hard disk drive, or the like, a manufacturing method thereof, and an arm positioning apparatus for manufacturing the rotary type actuator.

BACKGROUND TECHNOLOGY

In a rotary type actuator of a magnetic disk apparatus, a holder which is supported by a chassis so as to rotate has a plurality of arms for mounting magnetic heads and a coil part for generating a driving force. A magnet is placed in a desired position on the chassis in the configuration so that the arms are oscillated by an actuator part which is constructed of the magnet and the above described coil part. A head suspension element on which a magnetic head is provided is secured to the tip of each of these arms and is formed so that the magnetic head is shifted to a desired position according to the oscillation of the arms.

As for a conventional manufacturing method for such a rotary type actuator that shifts magnetic heads according to the oscillation of the arms, a method is known wherein grooves having a gap width slightly smaller than the plate thickness of the arms are formed in the external surface of the holder wherein one end of an arm is pressed into one of the grooves so as to be secured. After that, the holder, the arms and the coil part are mutually secured by injection molding a resin around the holder.

In the following, the conventional manufacturing method for a rotary type actuator is described in reference to FIGS. 6 and 7.

Part (a) of FIG. 6 is a plan view of a conventional rotary type actuator and part (b) of FIG. 6 is a cross sectional view along line IV(b)-IV(b) of part (a) in FIG. 6. FIG. 7 is a perspective view showing some portions in a penetrative manner in the condition after forming the conventional rotary type actuator.

As shown in parts (a) and (b) of FIG. 6, a plurality of grooves 101a which have a gap width slightly smaller than the plane thickness of arms 102 are formed in the external surface of a holder 101, and an arc portion which makes up one end of each arm 102 is pressed into each of these grooves 101a.

It is necessary to maintain the plurality of arms 102 placed in a layered manner as described above at the same potential through grounding. As shown in FIG. 7, an earth pin 110 that is formed of a conductive material is provided so as to penetrate through each arm 102 in order to maintain the plurality of arms 102 at the same potential through grounding in the conventional rotary type actuator. A through-hole 102a having a diameter slightly smaller than the diameter of the earth pin 110 is formed in each of the arms 102. The earth pin 110 is placed into the through-hole 102a of each arm 102 so as to electrically connect the respective arms 102 at the same potential.

After that the holder 101, to which the plurality of arms 102 is secured, is placed in a predetermined position within a metal mold together with the coil part 104 so as to be injection molded with a resin. As a result, the holder 101, the plurality of arms 102 and the coil part 104 are mutually secured with a resin part 106 and, thereby, the rotary type actuator is manufactured.

In the manufacture of the rotary type actuator it is extremely important to make constant the distance (C) between the center of oscillation (A) of the holder 101 and the center (B) of the suspension element attachment hole 102b in each arm 102 for attaching a head suspension element on which a magnetic head is mounted. In addition, in the case of the plurality of arms 102, it is necessary for the axis of each suspension element attachment hole 102b to be arranged in a coaxial manner and to be arranged in parallel to the axis of the center of oscillation of the holder 101.

FIG. 8 is a cross sectional side view showing the conventional manufacturing method for a rotary type actuator. As shown in a part (a) of FIG. 8, in a manufacturing step of a rotary type actuator, the holder 101 and the coil part 104 are placed in predetermined positions. And the plurality of arms 102 which are layered at predetermined intervals are positioned by a positioning pin 105 secured to the metal mold 107. The diameter of positioning pin 105 is such that it can be tightly inserted into the suspension element attachment hole 102b of each arm 102. The positioning pin 105 penetrates through each suspension element attachment hole 102b so that each arm 102 is placed in a predetermined position (predetermined position in the direction towards the center of oscillation and in the oscillation direction) The positioning pin 105 is secured so as to maintain the relationship between the center of oscillation (A) of the holder 101 and the center (B) of the suspension element attachment hole 102b. An arm 102 is placed in a predetermined position in this manner and, thereby, each suspension element attachment hole 102b of each of the arms 102 which are layered at predetermined intervals is placed in a coaxial manner with reliability.

As shown in part (a) of FIG. 8, the layered arms 102 are positioned by the positioning pin 105, the holder 101 is positioned by the holder positioning pin 120, and then resin injection molding operation is carried out for forming the rotary type actuator. Part (b) of FIG. 8 shows a condition of release from the mold of a product after resin injection molding, wherein a sleeve pin 108, which is placed around the outside of the positioning pin 105, and a mold release pin 121, which contacts the bottom of the holder 101, have risen. Sleeve pin 108 rises around the outside of the positioning pin 105. Mold release pin 121, which is placed outside of the holder positioning pin 120, rises at the same time as sleeve pin 108. This operation pushes up the arms 102 of the rotary type actuator. As a result, the suspension element attachment holes 102b of the arms 102 come off of the positioning pin 105.

As described above, in the conventional manufacturing method, since the position of the arms 102 are limited by the holder 101 and the positioning pin 105, expansion of the arms 102 due to heat generated at the time of resin molding negatively affects the circularity of the suspension element attachment holes 102b, the cylindrical shape of the suspension element attachment holes 102b of the layered arms 102, or the like. In addition, due to thermal expansion of the arms 102, the center (B) of the suspension element attachment holes 102b tends to shift from the center of the inserted positioning pin 105. Therefore, a great stress is caused between the positioning pin 105 and the suspension element attachment holes 102b so that the balance of each of the suspension element attachment holes 102b which are supposed to be arranged in a coaxial manner, is not achieved in some cases. In these cases, the frictional resistance at the time when the positioning pin 105 is pulled out of each suspension element attachment hole 102b becomes great and may cause warping or distortion in the arms 102. Because the arms 102 are formed of a light metal (such as aluminum), there is a problem that a sinter may easily occur due to the frictional resistance at the time when the positioning pin 105 is pulled out of the suspension element attachment holes 102b.

Furthermore, since the position of the arms 102 are limited by the positioning pin 105 due to resin contraction after injection molding, a problem may occur concerning deformation or frictional resistance of the suspension element attachment holes 102b. However, it is essential to utilize the above described positioning pin 105 in order to align the suspension element attachment holes 102b of the arms 102 in a coaxial line. Because there is some dimensional dispersion in each arm 102, the center of each suspension element attachment hole 102b is shifted in the case that the external form of the arms 102 is referred to for positioning. Therefore, there is a problem wherein it is difficult to attach the plurality of suspension elements by a swaging processing. In addition, warp or distortion occurs in the arms 102 at the time of manufacture and resin burrs also occur in some cases. Therefore, the positioning can not be carried out with respect to a reference of the external form of the actuator. Because of the above reasons, it is necessary to carry out the positioning on the basis of the suspension element attachment hole 102b of each arm 102 in the conventional manufacturing method.

As described above, in the conventional manufacturing method for the rotary type actuator, it is necessary to forcefully press the end portion of the arm 102 into the groove 101a of the holder 101 in order to secure the arm 102 to the holder 101 with reliability. Because the frictional resistance at the time of the press fitting of the arm is great, the force required to overcome the frictional resistance may lead to problems wherein the arm 102 is deformed.

Due to the deformation of the arms 102 (caused by the force required to overcome the frictional resistance at the time of press fitting), there is an additional error in the degree to which the layered arms are mutually parallel or in the dimensional precision of the arm attachment positions.

Additionally, the residual distortion to the arms at the time of the press fitting causes a problem wherein the degree to which the arms are mutually parallel changes during the operation of the rotary type actuator.

In addition, when the earth pin 110, which is a conductive member, is pressed into the through-holes 102a formed in the arms 102, burrs occur around the through-holes 102a of the arms 102 so as to cause dispersion in the diameter of the through-holes 102a. As a result, the contact condition between the earth pin 110 and each of the arms 102 becomes unstable. This instability causes a problem wherein the plurality of arms 102 of a conventional rotary type actuator, when constructed as described above, do not become of the same potential and lack stability in function.

The present invention provides a rotary type, actuator, a manufacturing method thereof as well as an arm positioning apparatus, wherein the above described problems in the conventional rotary type actuator are solved so that the arms are attached to the holder with a high precision and residual distortion of the arms does not occur at the time of assembly so as to gain a stable functioning. In the manufacturing method for the rotary type actuator according to the present invention, warp and distortion of the arms can be eliminated so as to carry out the positioning with a high precision utilizing the suspension element attachment holes of the arms and the positioning pin by using the arm positioning apparatus and the degree of being coaxial of the suspension element attachment hole of each arm can be secured with high precision.

DISCLOSURE OF INVENTION

A rotary type actuator according to the present invention comprises: arms in a plate shape for holding head suspension elements at one end;
  a holder in a cylindrical shape for holding said arms which are oscillated, wherein grooves having a gap width greater than the plate thickness of said arms are formed on the external surface of the holder and the other end of each of said arms is inserted into the grooves;
  a single coil part around which a wire is wound in an aligned manner;
  a conductive member in a band shape for maintaining said plurality of arms at the same potential through grounding; and
  a resin part for integrally combining said arms, said holder and said coil part at a predetermined position. In the rotary type actuator that is configured in this manner, the arms can be easily inserted into the grooves of the holder so that no stress is applied to the arms at the time of assembly. Accordingly, no deformation or residual distortion of the arms occurs at the time of assembly in this rotary type actuator. As a result, no error occurs in the degree to which the arms are mutually parallel or in the dimensions of the attachment height due to the deformation of the arms. Additionally, because there are no errors or residual distortion, there is no change to the degree to which the arms are parallel during operation of the rotary type actuator.

A manufacturing method for a rotary type actuator according to the present invention is a manufacturing method for a rotary type actuator having arms in a plate shape for holding head suspension elements at one end; a holder in a cylindrical shape for holding said arms which are oscillated by supporting the other end of each of said arms; and a single coil part around which a wire is wound in an aligned manner, having:
  a step of forming grooves having a gap width greater than the plate thickness of said arms in the external surface of said holder;
  a positioning step of positioning in the upward and downward direction by mounting the other end of each of said arms onto each of the upward facing surfaces of said grooves formed on the side of said holder;
  a step of connecting a conductive member in a band shape to the respective sides of said arms that are inserted into said grooves of said holder and of said holder; and
  a step of holding said arms, said holder and said coil part at a predetermined position while integrally combining said arms, said holder and said coil part by forming a resin part through injection molding. According to this manufacturing method, since the arms can be easily inserted into the grooves of the holder, no stress is applied to the arms at the time of assembly. Accordingly, no deformation or residual distortion of the arms occurs at the time of assembly. As a result, no error occurs in the degree of being parallel of the arms or in the dimensions of the attachment height due to the deformation of the arms at the time of assembly. Additionally, the degree of being parallel of the arms does not change due to residual distortion during operation. In addition, according to the manufacturing method of the present invention since the press fitting of an earth pin becomes unnecessary, burrs at the time of press fitting of such an earth pin or defective contacts due to dispersion in the hole diameter do not occur. As a result, according to the present invention, a rotary type actuator that is stable and that has a high precision can be provided. Here, in the manufacturing method of the present invention, it is preferable to secure the conductive member through ultrasonic welding and the conductive member in a band shape can be easily secured to the sides of the arms with a small plate thickness by using ultrasonic welding.

An arm positioning apparatus according to the present invention is an arm positioning apparatus for manufacturing a rotary type actuator which comprises arms in a plate shape for holding head suspension elements at one end, a holder in a cylindrical shape for holding said arms which are oscillated by supporting the other end of each of said arms, and a single coil part around which a wire is wound in an aligned manner, and secures said arms, said holder and said coil part at a predetermined position by resin molding, and said arm positioning apparatus comprises:
a positioning pin for positioning said arms by insertion into suspension element attachment holes of said arms which are placed at predetermined positions in said holder; and
a pin positioning means having a pin holder for holding said positioning pin which is movable in the arm positioning direction for positioning said arms at predetermined positions by restricting the movement of said positioning pin at the time of arm positioning and for releasing the restriction to said positioning pin after the completion of arm positioning. According to the present invention, because the positioning pin is in a freely movable; condition at the time of resin molding, after the completion of arm positioning; the arms are not restricted by the positioning pin at the time of arm expansion or of resin contraction. In addition, according to the present invention, high precision positioning of the arms and the degree of being coaxial of the suspension element attachment hole in each arm can be secured. Furthermore, according to the present invention, warp or distortion of the arms can be prevented so that the sinter of the positioning pin in the suspension element attachment holes can be prevented. In addition, the positioning pin can be withdrawn and pulled out of the arms in the condition wherein the arms are secured by a metal mold after the completion of resin molding so that the load to the arms can be reduced in comparison with the conventional system (where the arms are raised and pulled out of the positioning pin see FIG. 8). Thereby, warp and distortion of the arms can be prevented.

In a manufacturing method for a rotary type actuator according to the present invention, the rotary type actuator is manufactured by resin molding both sides of a holder member in a cylindrical shape for supporting arms on a chassis so as to rotate, and the arms have head suspension elements having magnetic heads at one end of each arm and a coil member, and the manufacturing method have:

a step of placing said arms at predetermined positions relative to said holder member which is held in a metal mold for resin molding;
a step of carrying out positioning of said arms by inserting a positioning pin in the suspension element attachment holes of said arms so as to restrain and position said positioning pin at a constant axis position;
a step of resin molding said arms by releasing the restriction of said positioning pin after the completion of arm positioning; and
a step of pulling out said positioning pin from said suspension element attachment holes after the completion of resin molding. According to the present invention, high precision positioning of the arms and the degree of being coaxial of each suspension element attachment hole in each of the plurality of arms are secured and warp or distortion of the arms can be prevented so that sinter of the positioning pin in the suspension element attachment holes can be prevented.

While the novel features of the invention are set forth particularly in the appended claims, the invention, both as to organization and content, will be better understood and appreciated, along with other objects and features thereof, from the following detailed description taken in conjunction with the drawings.

Figure 2:
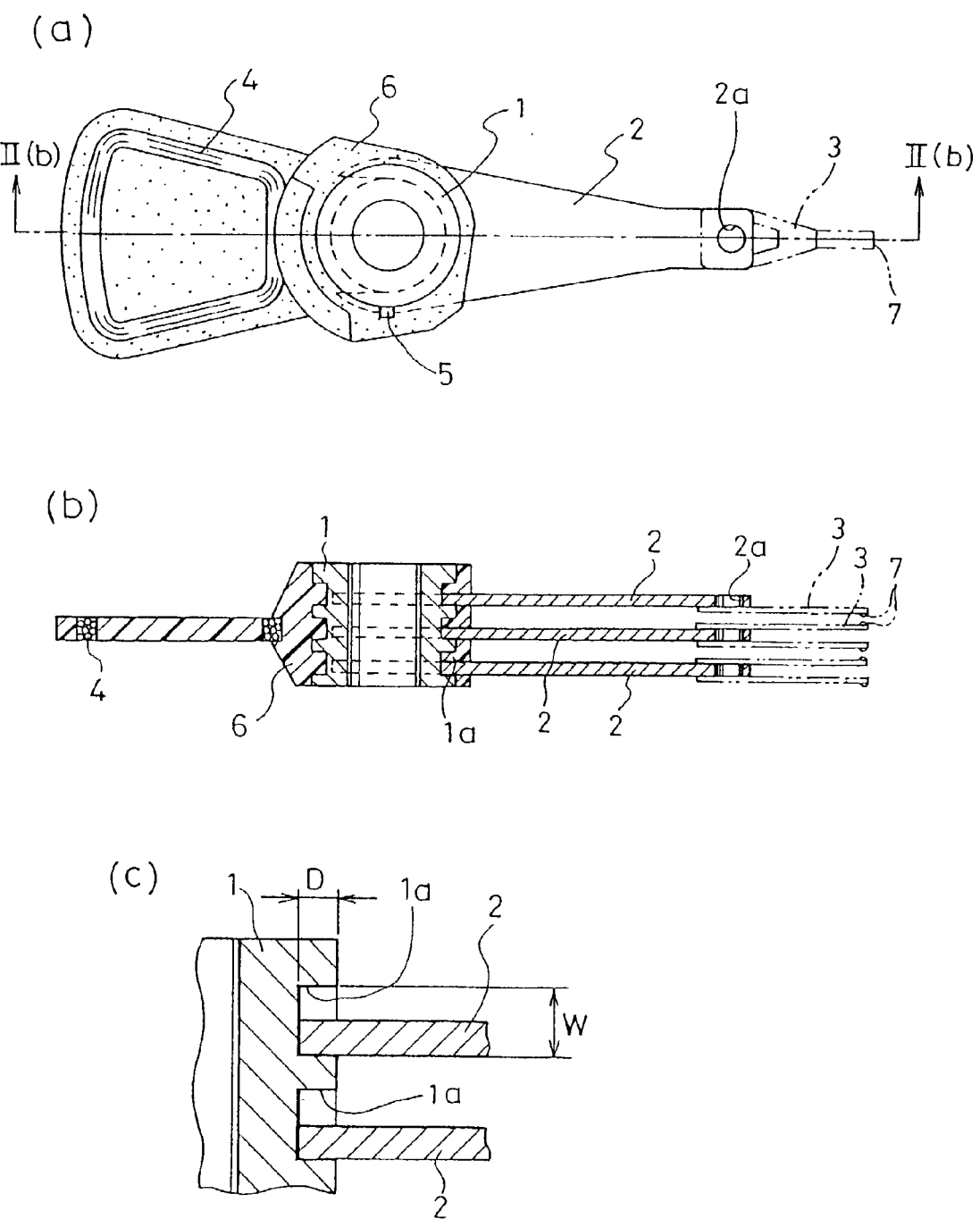
Figure 3:
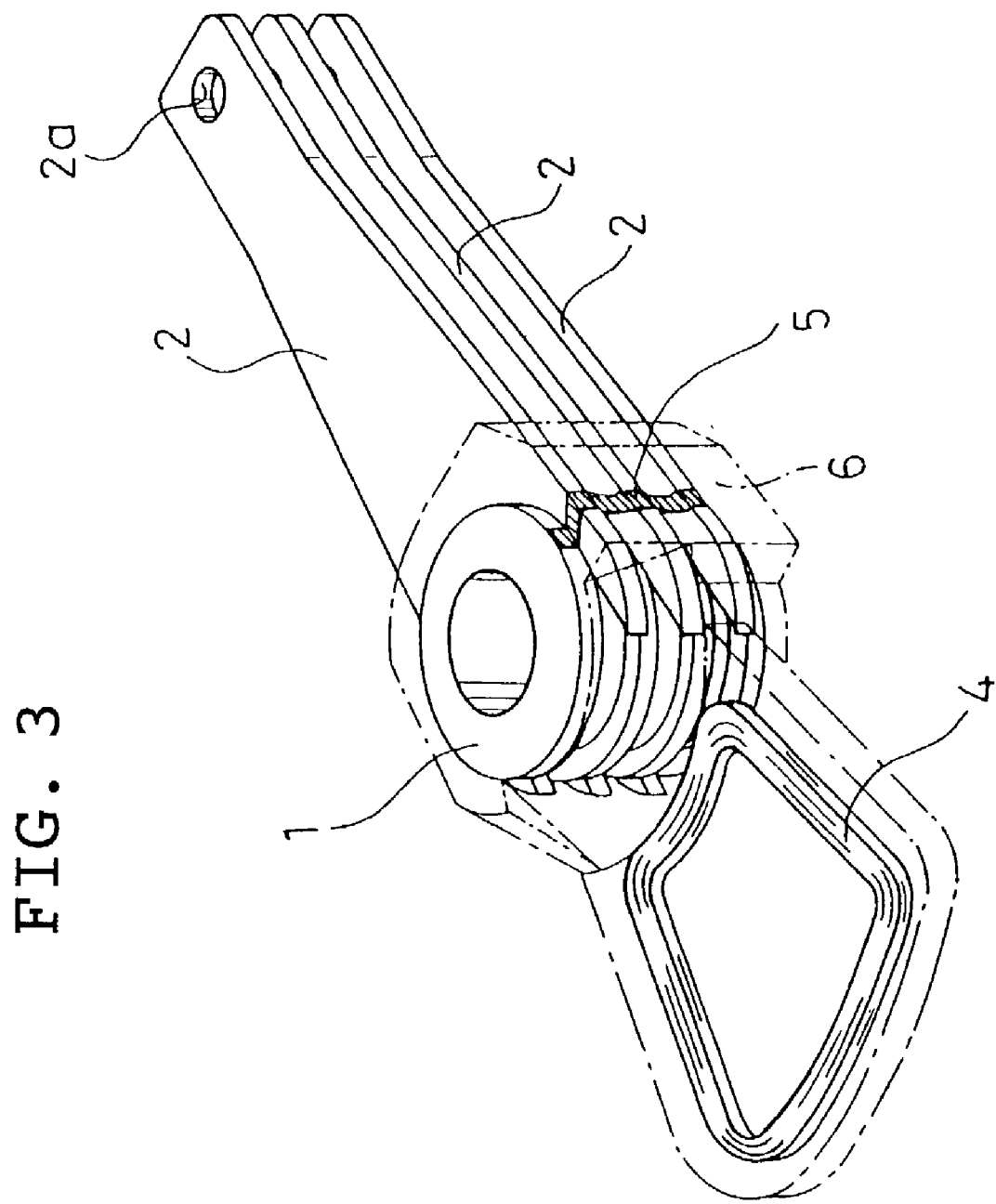
Figure 4:
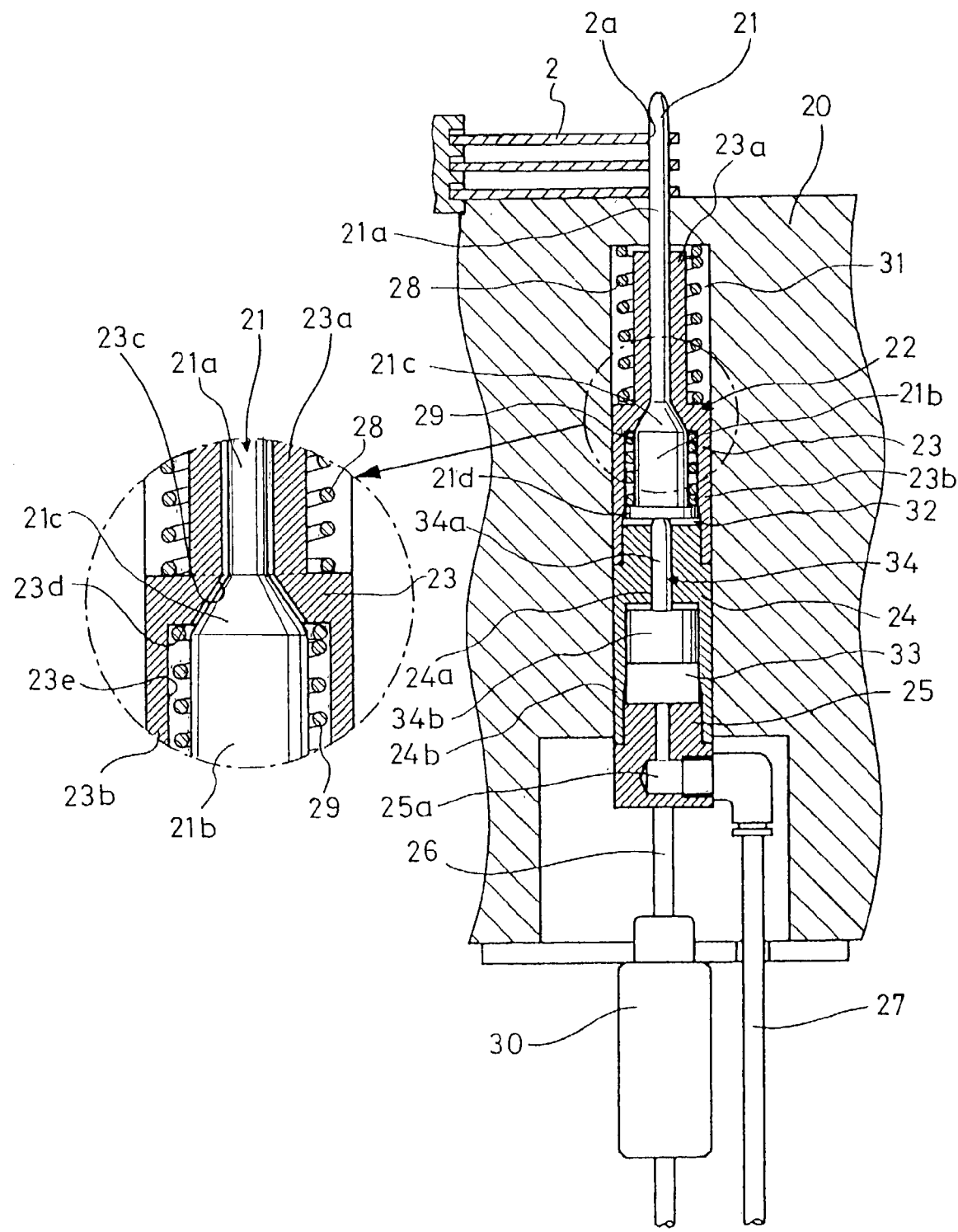
Figure 5:
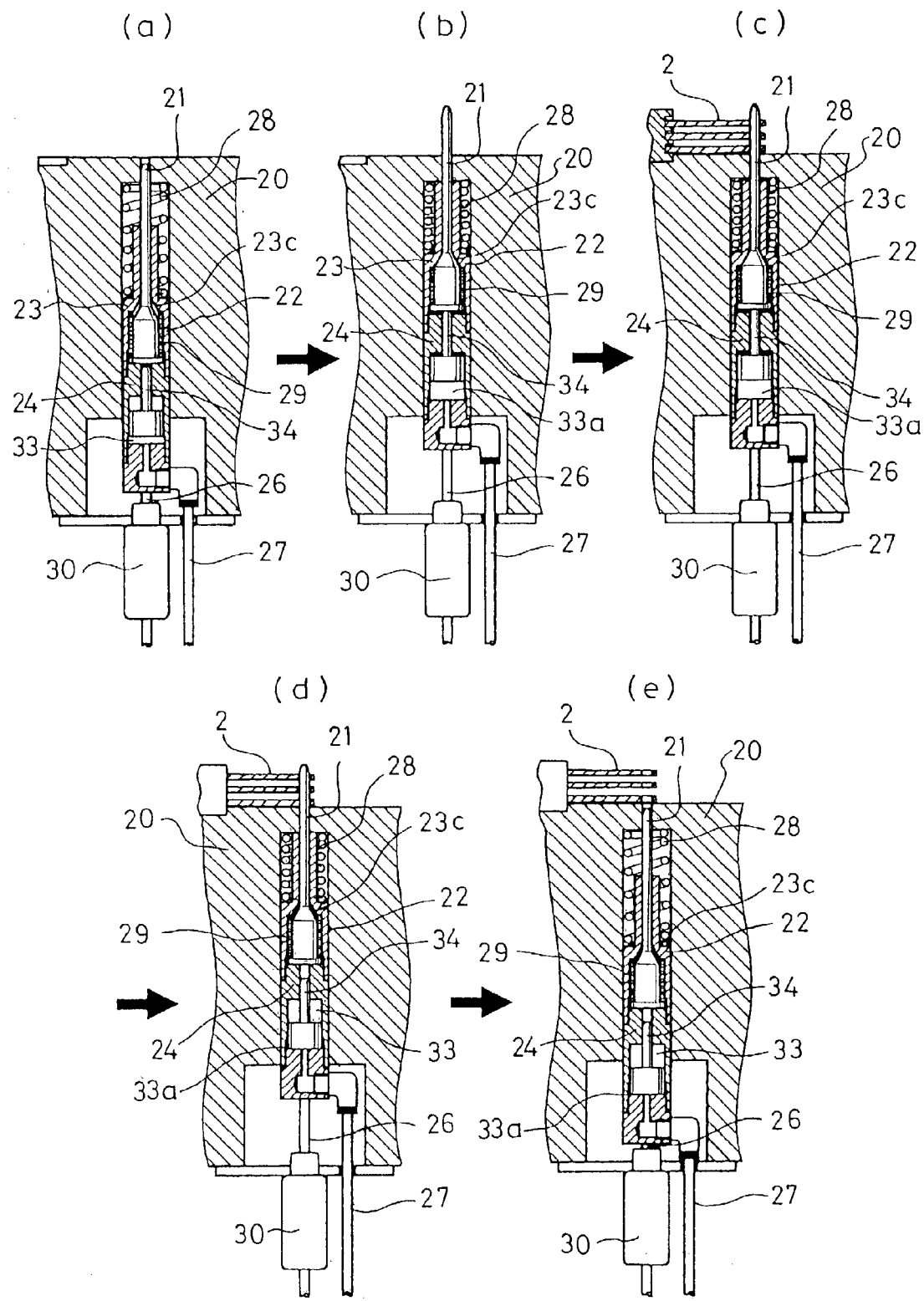
Figure 6:
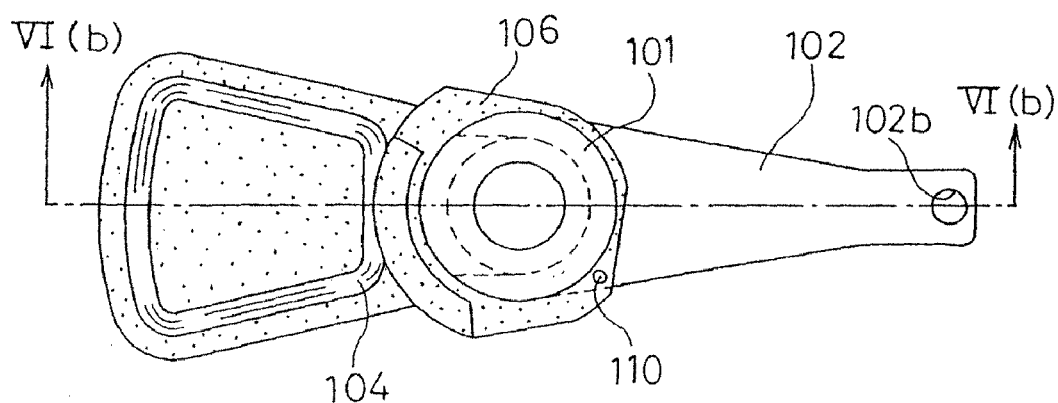
Figure 6:
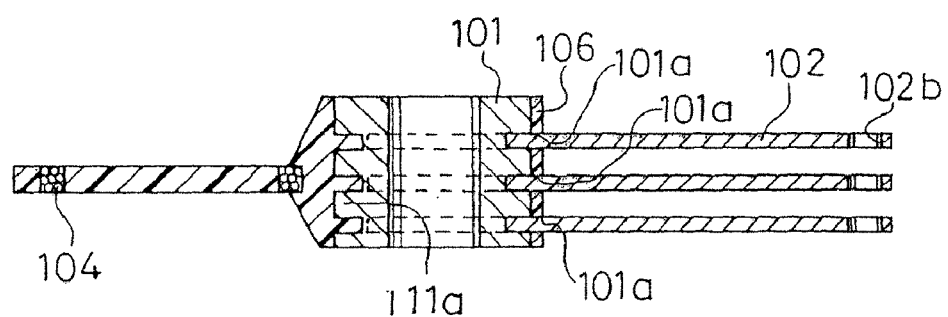
Figure 7:
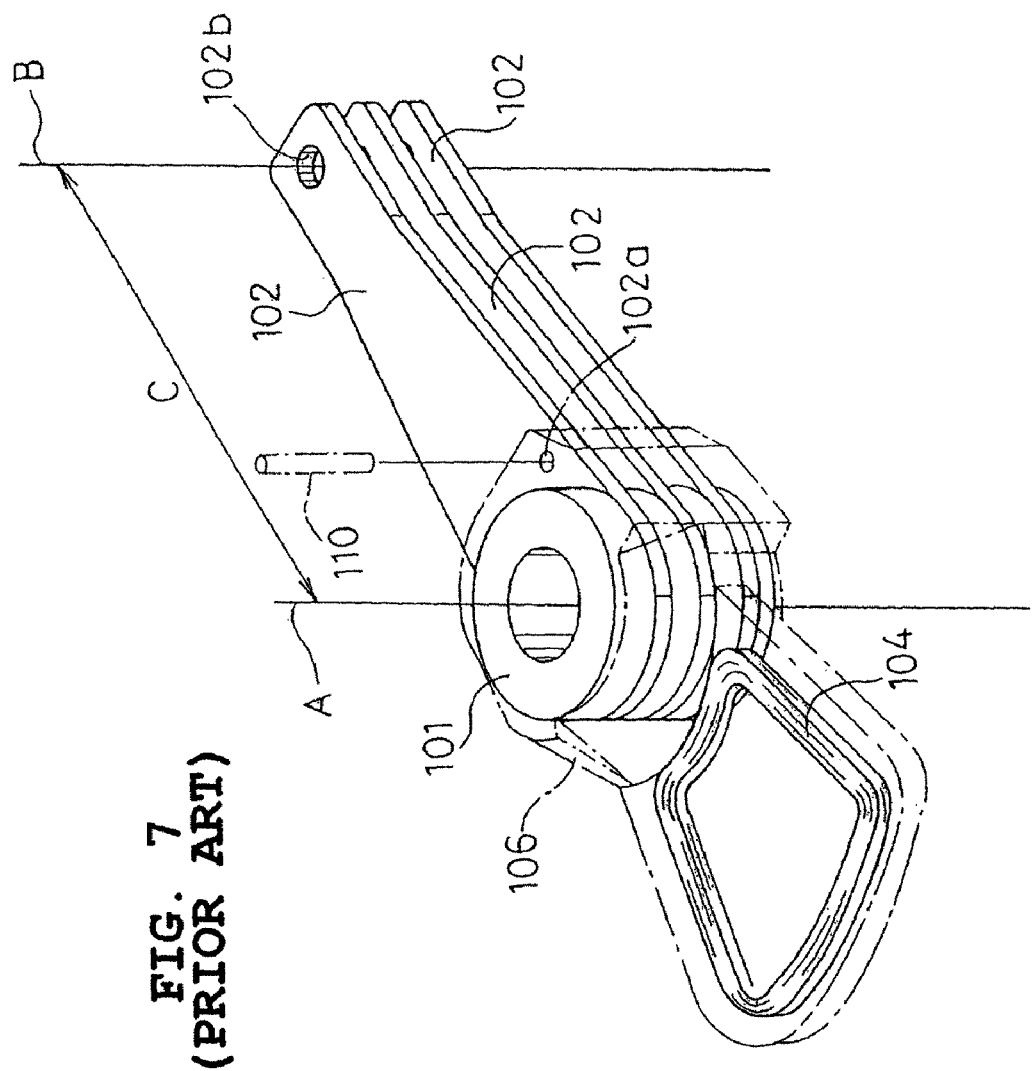
Figure 8:
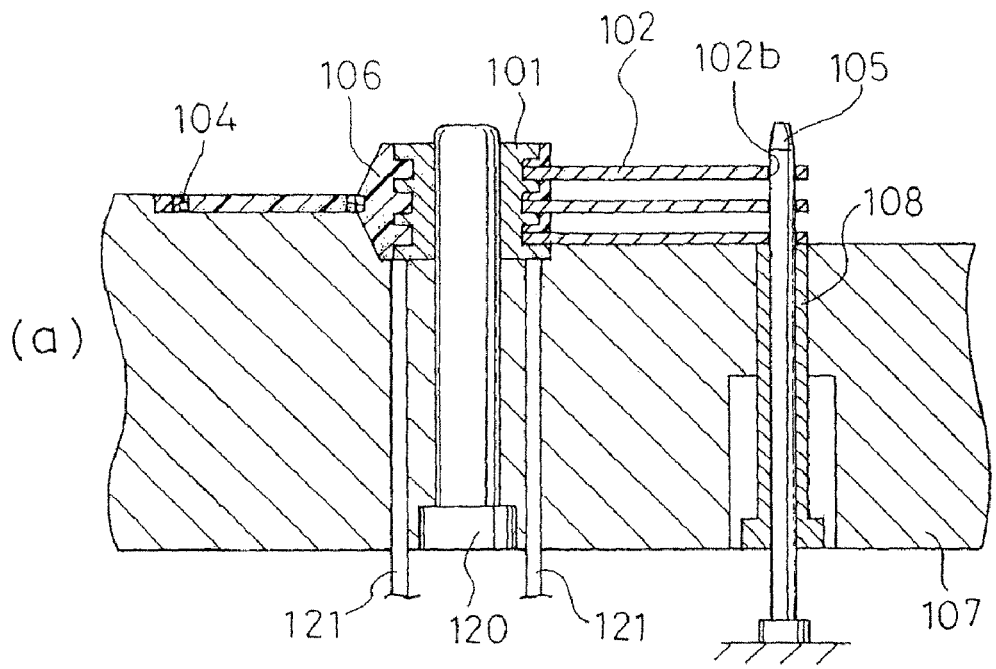
Figure 8:
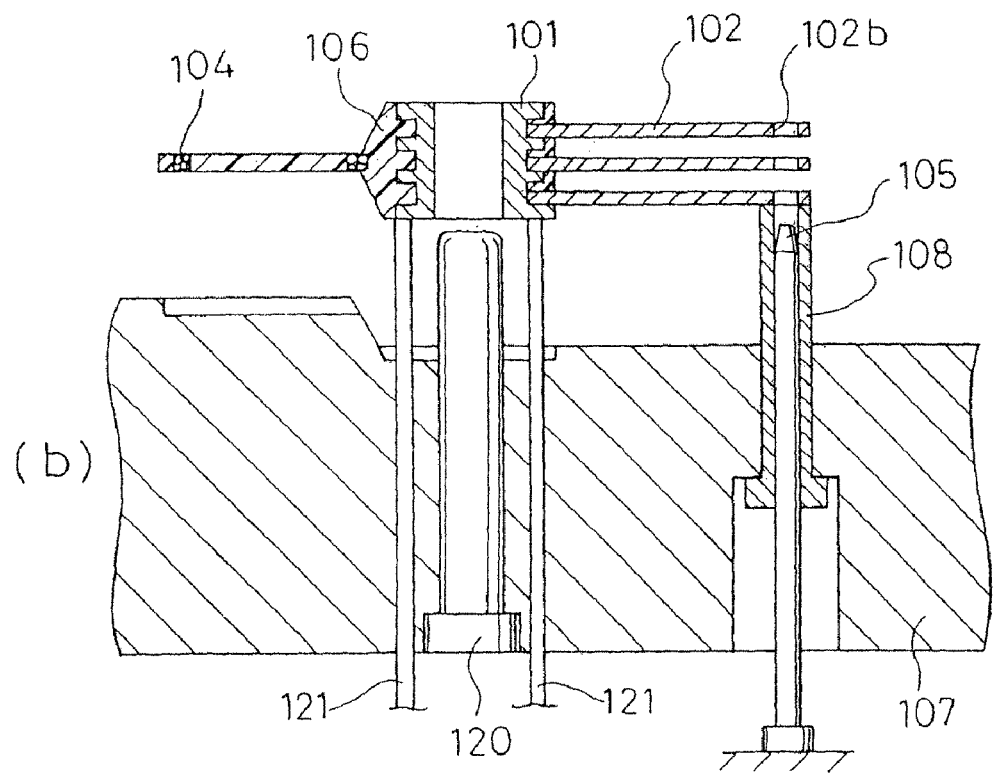

a part (a) of FIG. 2 is a plan view of the rotary type actuator of Embodiment 1 according to the present invention; a part (b) of FIG. 2 is a cross sectional elevation view of the part (a) in FIG. 2; a part (c) of FIG. 2 is a cross sectional view showing the enlarged connection part between the arms and the holder of the part (b) in FIG. 2;

FIG. 3 is a perspective view of a rotary type actuator showing a secured condition of a conductive member viewing the molding resin in a penetrative manner in the rotary type actuator of Embodiment 1 according to the present invention;

FIG. 4 is a configuration view showing an arm positioning apparatus in a rotary type actuator of Embodiment 2 according to the present invention;

FIG. 5 is an explanatory view showing the operations of the arm positioning apparatus in the rotary type actuator of Embodiment 2 in FIG. 4;

a part (a) of FIG. 6 is a plan view showing a conventional rotary type actuator; a part (b) of FIG. 6 is a cross sectional elevation view of the part (a) in FIG. 6;

FIG. 7 is a perspective view for describing the condition at the time of press fitting of the earth pin in the conventional rotary type actuator; and FIG. 8 is a view showing a conventional arm positioning apparatus that is used at the time of manufacture of the conventional rotary type actuator, wherein a part (a) of FIG. 8 is an explanatory view showing the condition wherein positioning takes place and a part (b) of FIG. 8 is an explanatory view showing the condition wherein release from the metal mold has taken place.

It will be recognized that some or all of the Figures are schematic representations for purposes of illustration and do not necessarily depict the actual relative sizes or locations of the elements shown.

BEST MODE FOR CARRYING OUT THE INVENTION

In the following, the preferred embodiments showing a rotary type actuator, a manufacturing method thereof and an arm positioning apparatus according to the present invention are described in reference to the attached drawings.

EMBODIMENT 1

Figure 1:
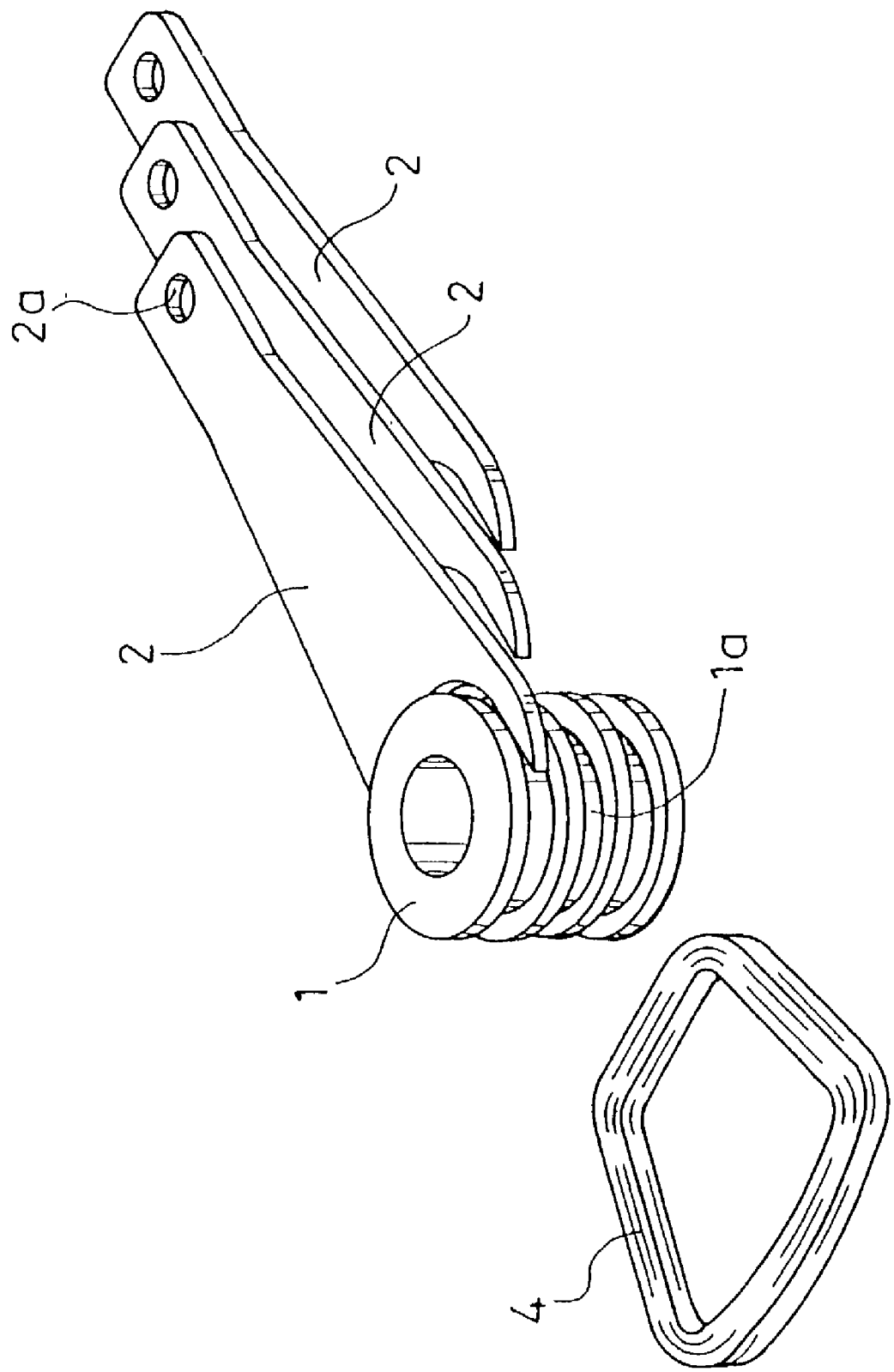
FIG. 1 is a perspective view showing components of a rotary type actuator before assembly of Embodiment 1 according to the present invention.

A rotary type actuator and a manufacturing method thereof of Embodiment 1 according to the present invention are described in reference to FIGS. 1 to 3.

FIG. 1 is a perspective view of each component before assembly of the rotary type actuator of Embodiment 1 according to the present invention. A part (a) of FIG. 2 is a plan view of the rotary type actuator of Embodiment 1 according to the present invention, a part (b) of FIG. 2 is a cross sectional elevation view of the rotary type actuator of the part (a) in FIG. 2 and a part (c) of FIG. 2 is a cross sectional view showing an expanded portion of the rotary type actuator of Embodiment 1. FIG. 3 is a perspective view showing the condition of the rotary type actuator after formation of Embodiment 1 viewing a portion in a penetrative manner.

As shown in FIGS. 1 and 2, the rotary type actuator of Embodiment 1 comprises a holder 1 supported by a chassis so as to rotate on the chassis, three arms 2, 2, 2 for mounting magnetic heads, and a coil part 4 for generating a driving force. This rotary type actuator is constructed so as to rotate the arms 2 by means of an actuator part formed of a magnet (not shown) placed at a desired position on the chassis and of the coil part 4. The coil part 4 is made by winding an enamel wire of a predetermined form in an aligned manner. A head suspension element 3 having a magnetic head 7 is secured to the tip of an arm 2. The head suspension element 3 is constructed so as to be secured into a suspension element attachment hole 2a which is formed in the tip of the arm 2, by a swaging processing.

A groove 1a having a gap width slightly broader than the plate thickness of the arm 2 is formed in the external surface of the holder 1 in the rotary type actuator of Embodiment 1. The number of grooves 1a in the external surface of the holder 1 correspond to the number of the arms 2 and three grooves 1a are formed at predetermined intervals in Embodiment 1. The end portion of the side that is inserted into a groove 1a in each arm 2 is formed in a concave arc shape or in a U shape in accordance with the form of the grooves 1a of the holder 1.

Next, a manufacturing method for the rotary type actuator of Embodiment 1 is described in reference to FIG. 2. The part (a) of FIG. 2 is a plan view of the rotary type actuator of Embodiment 1 and the part (b) of FIG. 2 is a cross sectional elevation view of the rotary type actuator of the part (a) in FIG. 2. The part (c) of FIG. 2 is a cross sectional view showing an enlarged connection portion of the arms 2 and the holder 1 in the rotary type actuator of the part (b) in FIG. 2.

In the rotary type actuator of Embodiment 1, the positions of a plurality (three) of arms 2 and the coil part 4 are determined relative to the holder 1 within a metal mold so that these members are relatively located in the predetermined positions. In the condition wherein the above members are located in such a manner, injection molding with a resin is carried out so that the body part of the rotary type actuator is manufactured.

As shown in the of FIG. 2, positioning of each arm 2 relative to holder 1 is carried out by making a tight contact between the bottom of the holder side edge portion of each arm 2 and the lower surface of the groove 1a which is formed in the holder 1 (surface of a groove 1a in the part (c) of FIG. 2 facing upward). The groove 1a has a depth D and a gap width W wherein the gap width W is provided so as to be greater than the plate thickness of an arm 2 so that each arm 2 is inserted therein. The depth D of groove 1a is set at a length such that the holder side edge part of an arm 2 can be supported with reliability. The length for the depth D of groove 1a is determined in consideration of the length of the groove 1a in the directions in which an arm 2 is led out (left and right directions in the part (c) of FIG. 2), in particular, the distance between a predetermined suspension element attachment hole 2a and the center of oscillation.

Assembly is carried out within a metal mold by inserting the holder side edge portion of each arm 2 into each groove 1a of the holder 1 which is formed as described above so as to make a contact with the lower surface of the groove and, then, by placing the coil part 4 so as to be in a predetermined positional relationship with the holder 1. A jig is used so that the holder 1, the arms 2 and the coil part 4 can maintain predetermined positional relationships within the metal mold. At this time, the sides of the holder 1 and each arm 2 are connected to each other with the below-described conductive member 5 in a band shape so as to achieve an electrically connected condition. The body of the rotary type actuator is manufactured by injection molding each portion of the body of the rotary type actuator that is placed within the metal mold in the above manner with a thermoplastic resin, for example a liquid crystal polymer, PPS, or the like.

Next, in the rotary type actuator of Embodiment 1, an electrical connection method between the holder 1 and each arm 2 is described.

The perspective view of FIG. 3 shows the body part of the rotary type actuator of Embodiment 1 manufactured as described above and shows the junction condition of the conductive member 5 in a band shape viewing the resin molding portion in a penetrative manner.

As shown in FIG. 3, the conductive member 5 in a band shape of preferably an aluminum foil or of a copper foil is welded and secured to the sides of the holder 1 and of each arm 2 through ultrasonic welding in the vicinity of the connection portion between the holder 1 and the arm 2. As for the conductive member 5 of Embodiment 1, an aluminum foil with a thickness of 0.05 mm is used. Since the holder 1 and each arm 2 are electrically connected in such a manner, each arm 2 of Embodiment 1 can be put in the grounded condition with reliability. In the condition wherein each arm 2 is connected through the conductive member 5 in such a manner, the holder 1, each arm 2, the coil part 4, the conductive member 5, and the like, are injection molded with a resin 6 shown by a one dotted chain line and secured to each other so that the body member of the rotary type actuator is integrally molded.

As described above, a predetermined number of grooves 1a, which have a gap width (W) greater than the thickness of the arms 2 and a predetermined depth (D), are formed in the external surface of the holder 1 in the rotary type actuator of Embodiment 1. And, the positions of the arms 2 in the height direction are determined by placing concave arc forms or U shaped forms of the holder side edge portions of the arms 2 onto the upper surfaces (surfaces facing upward in the part (c) of FIG. 2) of these grooves 1a. In addition, the arms 2 are positioned in the leading out direction (left and right directions in the part (c) of FIG. 2) by a jig (positioning pin) in the metal mold in the below described Embodiment 2. At this time, since the depth (D) of the grooves 1a of the holder 1 is formed so as to have a margin, it is possible to place the arms 2 in a predetermined positions in the leading out direction with reliability.

Each arm 2 is placed in a predetermined position relative to the holder 1 in the metal mold. And, injection molding is carried out within the metal mold including the coil part 4 with the resin 6 in the condition wherein the conductive member 5 is connected to the holder 1 and to each arm 2. As a result, each member of the rotary type actuator is integrally secured in a predetermined position with the resin 6.

Accordingly, in the manufacturing process in Embodiment 1, no stress is applied to the arms 2 when the arms 2 are inserted and placed in the grooves 1a of the holder 1. In addition, since the conductive member 5 in a band shape is secured to the respective sides of the holder 1 and each arm 2 by ultrasonic welding, no stress is applied to any arm 2 at the time when each arm 2 is mutually connected.

As described above, since no stress is applied to any arm 2 in the manufacturing process of Embodiment 1 according to the present invention, the arms 2 do not become deformed and the degree of being mutually parallel of the arms 2 as well as the dimensional precision of the attachment height of the arms 2 are increased. In addition, in Embodiment 1, deformation of the arms 2 at the time of operation according to a change over elapsed time due to residual distortion occurring at the time of press fitting can be eliminated. Furthermore, in Embodiment 1, since the conductive member 5 in a band shape makes an electrical connection between the holder 1 and the respective arms 2 with reliability, each arm 2 can be put in the grounded condition in a stable manner.

As in the above description of Embodiment 1, the rotary type actuator of Embodiment 1 according to the present invention comprises arms 2 for holding head suspension elements 3 having magnetic heads 7, a holder 1 in a cylindrical shape using as a center of the oscillation movement, a conductive member 5 for making a connection between each arm 2 and the holder 1, a coil part 4 and a resin 6 formed by injection molding.

In Embodiment 1, grooves 1a with a gap width greater than the thickness of the arms 2 are formed in the external surface of the holder 1 and one end of each of the arms 2 is mounted in one of these grooves 1a on one side of the wall surface so as to be positioned when placed within a metal mold. In addition, the conductive member 5 in a band shape is secured to the respective sides of each arm 2 and of the holder 1 in the vicinity of the connection portions between them. While the above described condition is maintained within the metal mold, the arms 2, the holder 1 and the coil part 4 are integrally combined through injection molding with a resin.

In Embodiment 1, since the arms 2 can be easily inserted into the grooves 1a of the holder 1, no stress is applied to the arms 2. As a result, deformation of the arms 2 is eliminated so that the degree of being parallel of the arms and the precision of the attachment positions of the arms can be increased. In addition, in the manufacturing method in Embodiment 2 since no stress is applied to the arms 2, no residual distortion occurs and the occurrence of defects in the degree of being parallel of the arms due to deformation of the arms 2 can be prevented during operation.

In addition, according to the manufacturing method for the rotary type actuator of Embodiment 1, the conductive member 5 in a band shape is secured to the respective sides of the arms 2 of the holder 1 in the vicinity of the connection portion between them through ultrasonic welding so as to be integrally combined through injection molding with a resin while maintaining the above connection condition. Thereby, assembly can be carried out without applying stress to the arms 2 so that each arm 2 can be connected without dispersion of resistance values so as to achieve grounding with reliability. As a result, the rotary type actuator of Embodiment 1 has a stable performance.

EMBODIMENT 2

A manufacturing method for a rotary type actuator of Embodiment 2 according to the present invention is described in reference to FIGS. 4 and 5.

FIG. 4 is a cross sectional view showing the configuration of an arm positioning apparatus in the manufacturing method for the rotary type actuator of Embodiment 2 according to the present invention. This arm positioning apparatus is utilized in the manufacture of the rotary type actuator of the above-described Embodiment 1. The configuration of the rotary type actuator manufactured in the manufacturing method of Embodiment 2 is the same as that of the above-described Embodiment 1. Therefore, these explanations are omitted.

As described in the above Embodiment 1, positioning of a plurality (three in the present embodiment) of arms 2 in the axis directions (from up-and-down directions in FIG. 4) relative to the holder is completed within a metal mold. In the manufacturing method for the rotary type actuator of Embodiment 2, positioning of the arms 2 relative to the holder in the leading our directions (left and right directions in FIG. 4) is carried out.

As shown in FIG. 4, a positioning pin 21 that can move upward and downward inside of a metal mold 20 is inserted into suspension element attachment holes 2a that are formed in the vicinity of the leading out edge portions of the respective arms 2 and, thereby, positioning of the arms 2 is carried out. Though the case wherein there are three arms 2 is described in Embodiment 2, the arm positioning apparatus of Embodiment 2 can be used in the case of one arm. In the case that a plurality of arms 2 are layered at predetermined intervals, the suspension element attachment holes 2a of the respective arms 2 can be arranged in a coaxial manner by the arm positioning apparatus of Embodiment 2.

The axis of the positioning pin 21 in the arm positioning apparatus is placed in parallel to the axis of the holder which is fixed in a metal mold and is also installed so as to maintain a predetermined constant distance away from the axis of the holder. At this time, some clearance (approximately 0.05 mm) is provided between the positioning pin 21a and the metal mold 20.

As shown in FIG. 4, the positioning pin 21 is held by a pin holder 22 which is placed in a pin containment chamber 31 formed inside of the metal mold 20 so as to be movable in the upward and downward directions. The positioning pin 21 has a small diameter portion 21a that can be engaged into the suspension element attachment holes 2a of the arms 2, a cone portion 21c that is formed beneath this small diameter portion 21a and that engages with the inclined surface within the pin holder 22 and a large diameter portion 21b that is formed beneath this cone portion 21c. A flange portion 21d that protrudes in the radial direction is formed in the lower end portion of the large diameter portion 21b.

In Embodiment 2 coatings such as DLC (diamond-like carbon), CrN, or the like, are applied to the surface of the positioning pin 21 that contacts the arms 2 so as to form a uniform pin diameter in order to prevent sinter.

The pin holder 22 is assembled by the first holder 23, the second holder 24 and the third holder 25 which are sequentially placed along the axis directions (hereinafter referred to as up-and-down directions) of the positioning pin 21. The first holder 23 contains the positioning pin 21 within a containment portion 23a having a small diameter and a containment portion 23b having a large diameter. The containment portion 23a having the small diameter of the first holder 23 contains the small diameter portion 21a of the positioning pin 21 with some clearance (approximately 0.05 mm) in the diameter direction so as to guide the movement (entering and exiting) in the up-and-down directions and is formed to be shorter than the small diameter portion 21a. The inner surface of the containment portion 23b having the large diameter of the first holder 23 comprises a inclined surface 23c with which the cone portion 21c of the positioning pin 21 makes contact, a flat surface 23d opposite to the flange portion 21d in the diameter directions, and an arc surface 23e on which the flange portion 21*d* can slide. The external surface of the first holder 23 is formed so as to slide on the inner walls of the pin containment chamber 31.

As shown in the enlarged view of FIG. 4, a compression spring 29, which surrounds the large diameter portion 21*b* of the positioning pin 21, is provided between the flat surface 23*d* of the containment portion 23*b* of a large diameter of the first holder 23 and the flange portion 21*d* of the positioning pin 21. The positioning pin 21 is compressed in a downward direction by this compression spring 29. In addition, a compression spring 28, which surrounds the containment portion 23*a* of the small diameter, is provided between the upper surface (surface facing upward) of the containment portion 23*b* of the large diameter of the first holder 23 and the surface of the ceiling of the pin containment chamber 31. The first holder 23 is compressed in the downward direction by this compression spring 28. As a result, the entirety of the pin holder 22 is compressed in the downward direction.

The second holder 24, placed beneath the first holder 23, is placed so as to close the lower end portion of the first holder 23 having a space 32 between the second holder 24 and the positioning pin 21. In addition, the second holder 24 contains a first pressing pin 34 for depressing the positioning pin 21 from beneath. This second holder 24 contacts the inner wall surface of the pin containment chamber 31 on the external surface thereof. The second holder 24 contains a small diameter portion 34*a* of the first pressing pin 34 so that the first pressing pin is movable in the up-and-down directions by having some clearance in the diameter direction. The second holder 24 has a containment portion 24*a* of the small diameter that guides the small diameter portion 34*a* of the first pressing pin 34 in a movable manner and a containment portion 24*b* of the large diameter that holds the large diameter portion 34*b* of the first pressing pin 34 in a slidable manner.

Furthermore, the third holder 25, which is placed beneath the second holder 24, is placed so as to close the lower end portion of the second holder 24 having a space 33 between the third holder 25 and the first pressing pin 34. The external surface of the third holder 25 contacts the inner wall surface of the pin containment chamber 31. A through-hole 25*a* is formed in the third holder 25. The through-hole 25*a* is connected by a tube 27 so as to link the space 33 inside of the second holder 24 to a pressure adjustment apparatus. In addition, the end portion of the second pressing pin 26 that moves in the up-and-down directions by means of a driving means such as a cylinder actuator or a motor 30 contacts the lower end of the third holder 25.

The operation of the arm positioning apparatus in the manufacturing method for the rotary type actuator of Embodiment 2 which is formed as in the above is described in reference to FIG. 5.

FIG. 5 is a view for describing the operation of the arm positioning apparatus in the manufacturing method for the rotary type actuator of Embodiment 2.

First, in the manufacturing process for the rotary type actuator, as shown in parts (a) and (b) of FIG. 5, first, the positioning pin 21 that is contained inside of the metal mold 20 is raised. At this time, as shown in the part (b) of FIG. 5, the pin holder 22 is placed in the uppermost position by means of the second pressing pin 26. At this time, air with the pressure given by the pressure adjustment apparatus is led to a lower side space 33*a* that is beneath the first pressing pin 34 via the tube 27 so that the pressure within this lower side space 33*a* is increased. Thereby, the first pressing pin 34 is raised. The positioning pin 21 is raised until the cone portion 21*c* thereof contacts the inclined surface 23*c* of the first holder 23 in accordance with the raising of this first pressing pin 34. The positioning pin 21 stops by contacting the inclined surface 23*c* in such a manner. And, the small diameter portion 21*a* which is led out in the upward direction from the metal mold 20 is secured in a constant position relative to the metal mold 20 in the up-and-down directions and in the diameter directions (left and right directions in FIG. 5). The cone portion 21*c* contacts the inclined surface 23*c* in such a manner. And, the center of the small diameter portion 21*a* of the positioning pin 21 which is led out from the metal mold 20 is placed with reliability in a predetermined position relative to the metal mold 20.

Next, as shown in a part (c) of FIG. 5, the small diameter portion 21*a* of the positioning pin 21 which is led out in a predetermined position is inserted into the suspension element attachment hole 2*a* of each arm 2. At this time, each arm 2 is placed so as to have predetermined positional relationships relative to the holder 1 which is maintained in a predetermined position in the metal mold 20. At this time, by engaging the suspension element attachment hole 2*a* of each arm 2 with the small diameter portion 21*a* of the positioning pin 21, the positioning of each arm 2 relative to the holder 1 can be carried out with reliability and the degree of being coaxial of each, suspension element attachment hole 2*a* can be secured.

When the positioning of each arm 2 is completed as shown in the part (c) of FIG. 5, the pressure in the lower side space 33*a* which is beneath the first pressing pin 34 is reduced by the pressure adjustment apparatus so that the first pressing pin 34 is lowered as shown in a part (d) of FIG. 5. The positioning pin 21 is lowered by the compressive force of the compression spring 29 in accordance with the lowering of this first pressing pin 34 so that the cone portion 21*c* of the positioning pin 21 separates from the inclined surface 23*c* of the first holder 23. At this time, the small diameter portion 21*a*, the metal mold 20 and the containment part 23*a* of a small diameter have a certain amount of clearance (approximately 0.05 mm). As a result, the small diameter portion 21*a* of the positioning pin 21 is in a condition that is slightly movable in the diameter direction while maintaining each arm 2 in a coaxial manner. In the condition wherein the small diameter portion 21*a* of the positioning pin 21 holds each arm 2 in such a manner, each component of the rotary type actuator such as the holder 1, each arm 2 and the coil part is placed in a predetermined position relative to the metal mold 20 and is molded with resin.

After completing the resin molding in the condition shown in the part (d) of FIG. 5, the second pressing pin 26 is lowered by driving the cylinder actuator or motor 30 as shown in apart (e) of FIG. 5. Thereby, the pin holder 22 is lowered by the compressive force of the compressing spring 28 so that the small diameter portion 21*a* of the positioning pin 21 is pulled out from the suspension element attachment hole 2*a* of each arm 2. After the completion of the pulling out operation in such a manner, the completed rotary type actuator is taken out from the metal mold 20.

As described above, according to the manufacturing method for the rotary type actuator of Embodiment 2, the system is formed such that each arm 2 is held in the condition wherein the positioning pin 21 is freely movable within a slight range after the positioning of the arm 2 relative to the holder 1 within the metal mold 20 is carried out by the positioning pin 21. In Embodiment 2 the system is formed such that each arm 2 is held by the positioning pin 21 which is in a freely movable condition before being fixed in a resin in the above manner. After that, the positioning pin 21 is pulled out from the suspension element attachment hole 2*a* of each arm 2. Therefore, in the manufacturing method for the rotary type actuator of Embodiment 2, each arm 2 is not restricted by the positioning pin 21 even at the time of thermal expansion of the arms 2 or at the time of resin contraction in the resin injection molding process. As a result, the problem of deformation or sinter in the suspension element attachment holes 2a is solved in Embodiment 2.

In addition, in the manufacturing method for the rotary type actuator of Embodiment 2, there is not a process of forcefully pulling out the sleeve pin from the arms after resin molding or of directly lifting up the manufactured rotary type actuator as described in the above section of the prior art. Therefore, according to the manufacturing method for the rotary type actuator of Embodiment 2, warp and distortion of the arms can be eliminated. Thereby, the optimal positions and forms of the arms are maintained in Embodiment 2 so that the degree of being coaxial of the suspension element attachment holes can be secured.

Furthermore, coating is applied to the positioning pin 21 so as to reduce the frictional resistance in the manufacturing method for the rotary type actuator of Embodiment 2. As a result, when the arms 2 are pulled out of the positioning pin 21, the arms 2 can move smoothly, warp and distortion of the arms 2 can be eliminated and the coaxial condition of the suspension element attachment holes 2a can be secured while maintaining the optimal positions and forms of the arms 2. As described above, it becomes easy to make the dimensions of a product of the manufactured rotary type actuator to fall within the standard according to the manufacturing method for the rotary type actuator of Embodiment 2.

According to the arm positioning apparatus for manufacturing the rotary type actuator in Embodiment 2, the cone portion 21c of the positioning pin 21 contacts the inclined surface 23c of the pin holder 22. And, the positioning of the positioning pin 21 in the axis direction and in the diameter direction can be carried out easily and with reliability.

According to the arm positioning apparatus of Embodiment 2, the rotary type actuator with a high precision can be easily manufactured by placing the positioning pin 21 in the arm positioning position, in the arm holding position and in the stand-by position easily and with reliability.

According to the arm positioning apparatus of Embodiment 2, the positioning pin 21 can be automatically placed in the arm holding position at the time of molding by releasing the pressure from the first pressing pin 34 and, in addition, the positioning pin 21 can be automatically placed in the stand-by position by releasing the pressure from the second pressing pin 26.

In the arm positioning apparatus of Embodiment 2, the surface of the positioning pin 21 is coated so as to reduce the frictional resistance between the arms 2 and the positioning pin 21. And, according to the arm positioning apparatus of Embodiment 2, sinter is prevented with reliability and warp and distortion of the arms are eliminated.

As described above, the arm positioning apparatus in the manufacturing method for the rotary type actuator of Embodiment 2 according to the present invention is formed such that the positioning pin 21 is formed so as to be moveable and such that a restricted condition or freely movable condition (released condition) is selectable in a predetermined position. Therefore, the arms 2 are positioned in the condition wherein the positioning pin 21 is restricted by using the arm positioning apparatus of Embodiment 2. After that, the arms 2 are held by the positioning pin 21 in the released condition before resin molding is carried out and, then, it becomes possible to easily pull out the positioning pin 21 from the arms 2 after the arms 2 are secured in the resin.

According to the manufacturing method for the rotary type actuator of Embodiment 2, the arms 2 are not regulated by the positioning pin 21 at the time of thermal expansion of the arms 2 or at the time of resin contraction so that there is no process of directly lifting up the arms as in the prior art. Therefore, the problem of deformation or sinter of the arms 2 taking place in the suspension element attachment holes can be solved. In addition, according to the manufacturing method for the rotary type actuator of Embodiment 2, warp and distortion of the arms 2 can be eliminated and an excellent rotary type actuator that meets the product dimension standard can be gained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present invention provides a rotary type actuator wherein magnetic heads are precisely placed in predetermined positions relative to the oscillation center of the holder-that is the rotary type actuator which is used in a recording and reproduction apparatus such as a magnetic disk apparatus for carrying out recording and reproduction, a hard disk drive, or the like.

The invention claimed is:

1. An arm positioning apparatus for manufacturing a rotary type actuator which comprises arms in a plate shape for holding head suspension elements at one end, a holder in a cylindrical shape for holding said arms which are oscillated by supporting the other end of each of said arms, and a single coil part around which a wire is wound in an aligned manner, and secures said arms, said holder and said coil part at a predetermined position by resin molding, and said arm positioning apparatus comprises:
a positioning pin for positioning said arms by insertion into suspension element attachment holes of said arms which are placed at predetermined positions in said holder, wherein
said positioning pin has a small diameter portion that is engaged in the suspension element attachment holes and a cone portion which has a diameter that gradually spreads outward from said small diameter portion, and
said pin holder of said pin positioning means has a cylindrical surface with a small diameter that guides the movement of the small diameter portion of said positioning pin and an inclined surface that makes contact with and is positioned by the cone portion of said positioning pin; and
a pin positioning means having a pin holder for holding said positioning pin which is movable in the arm positioning direction for positioning said arms at predetermined positions by restricting the movement of said positioning pin at the time of arm positioning and for releasing the restriction to said positioning pin after the completion of arm positioning.

2. An arm positioning apparatus according to claim 1, further comprising:
a first pressing means that can depress said positioning pin in said arm positioning direction and a second pressing means that can depress said pin holder in said arm positioning direction of said positioning pin are provided inside of a containment chamber containing said pin positioning means which can slide freely;

said pin holder is placed in a predetermined upper position by said second pressing means and said positioning pin is placed in the two places of a arm positioning position and an arm holding position by said first pressing means; and said pin holder is placed in a predetermined lower position by said second pressing means so that said positioning pin is placed in a stand-by position wherein said positioning pin comes out of said suspension element attachment holes of said arms.

3. An arm positioning apparatus according to claim 1 wherein said positioning pin has a large diameter portion that continues to said cone portion and a flange portion that protrudes in the radial direction from said large diameter portion, and said pin holder has a cylindrical surface of a large diameter on which said flange portion slides and a flat surface that forms a step between said cylindrical surface of a large diameter and the inclined surface, a first compression means is provided between the flange portion of said positioning pin and the flat surface of said pin holder so as to compress the flange portion of said positioning pin and the flat surface in the direction wherein the two move away from each other, a second compression means is provided between the surface of a ceiling of the containment chamber that contains said pin positioning means in a freely slidable manner and said pin holder so as to compress the surface of the ceiling and said pin holder in the direction wherein the two move away from each other.

4. An arm positioning apparatus according to claim 1, wherein a surface of said positioning pin that is inserted into said suspension element attachment holes of said arms is coated with a sinter prevention material.

5. An arm positioning apparatus according to claim 1 that is built into a metal mold for resin molding.

* * * * *